United States Patent [19]
Yamaguchi

[11] Patent Number: 5,861,996
[45] Date of Patent: Jan. 19, 1999

[54] OBJECTIVE LENS SYSTEM FOR A MICROSCOPE

[75] Inventor: Kotaro Yamaguchi, Yokohama, Japan

[73] Assignee: Nikon Corporation, Tokyo, Japan

[21] Appl. No.: 845,839

[22] Filed: Apr. 28, 1997

[30] Foreign Application Priority Data

Apr. 26, 1996 [JP] Japan .................................. 8-107578

[51] Int. Cl.$^6$ ................................................ G02B 21/02
[52] U.S. Cl. .......................................... 359/656; 359/661
[58] Field of Search ..................................... 359/656–661

[56] References Cited

U.S. PATENT DOCUMENTS

5,076,676 12/1991 Saito ........................................ 359/656

Primary Examiner—Georgia Epps
Assistant Examiner—Michael Lucas
Attorney, Agent, or Firm—Chapman and Cutler

[57] ABSTRACT

An objective lens system for a microscope has a high magnification and high numerical aperture. Corrections for various aberrations, and especially coma, can be made over a wide field of view. The system can be used as an objective lens system for a fluorescence microscope. The objective lens system contains a first lens group which has multiple lenses placed in sequence as counted from the object side. The first lens group has a positive focal power. A second lens group includes a first compound lens, prepared by cementing a negative meniscus lens with its convex surface facing the object side and a biconvex lens, and a second compound lens, prepared by cementing a biconcave lens and a biconvex lens. A third lens group has multiple lenses and a negative focal power. A change in aberration can be corrected for by moving the second lens group with respect to the first and third lens groups along the optical axis. The objective lens system meets certain prescribed conditions.

20 Claims, 9 Drawing Sheets

FIG. 1

FIG. 2a
SPHERICAL ABERRATION

FIG. 2b
ASTIGMATISM

FIG. 2c
DISTORTION (%)

FIG. 2d
COMA

SPHERICAL ABERRATION

FIG. 7b

ASTIGMATISM

FIG. 7c

DISTORTION (%)

FIG. 7d

COMA

OBJECTIVE LENS SYSTEM FOR A MICROSCOPE

BACKGROUND OF THE INVENTION

1. Field of the Invention

This invention pertains to an objective lens system for a microscope. More specifically, this invention pertains to an objective lens system for a microscope equipped with a correcting ring that can correct for a change in aberration when the thickness of a cover glass changes. The system can also be used for fluorescence excited by UV rays.

2. Description of Related Art

When a biological microscope specimen is prepared for examination by a microscope, the specimen is usually placed on a glass slide and covered by a cover glass for sealing. A "coverglass-attached" specimen is formed in this way. The thickness and refractive index of the cover glass meet certain standards such as, for example, the Japanese Industrial Standards (JIS). In general, the thickness of the cover glass is set at 0.17 mm. This thickness is considered to be the standard thickness.

When the thickness of the cover glass is different from the standard thickness, the focusing ability of the objective lens system of the microscope is degraded. The influence of the thickness error is significant in that it results in the numerical aperture (often referred to as NA hereinafter) becoming large. When the NA increases to a certain degree, a portion of the objective lens system of the microscope is shifted to correct for the change in the aberration. Therefore, a correcting ring is usually provided in the objective lens system.

Certain techniques relating to objective lens systems for microscopes equipped with correcting rings are disclosed in Japanese Kokai Patent Application Nos. Sho 57[1982]-148717 and Sho 59[1984]-100409. Although the NA in these systems is not very large, corrections for changes in thicknesses of the cover glass on the order of a millimeter can be made. Other techniques, such as those disclosed in Japanese Kokai Patent Application Nos. Sho 61[1986]-275812 and Hei 5[1993]-119263, can be corrected differently. Although the correction ranges for the thicknesses of the cover glasses is small in these other systems, the various aberrations can be corrected to certain degrees over wide fields of view at high NAs.

In the biological field, the fluorescence microscope is now widely used. By fluorescence-dyeing a specific substance, cells can be observed without being damaged. A short-wavelength light beam is irradiated on the specimen (for excitation). The excited fluorescence is then observed by the fluorescence microscope. A typical example of short excitation wavelength light is light at the i-line (365 nm). Excitation light at a wavelength of 340 nm has also been used to observe calcium ions in living bodies.

In the systems disclosed by Japanese Kokai Patent Application Nos. Sho 57[1982]-148717 and Sho 59[1984]-100409, NAs are as small as 0.55 and 0.7, respectively. As a result, the resolving power of these systems is inadequate. When a correction for a change in the thickness of the cover glass is made in either of these systems, the coma is degraded. This is a disadvantage.

The objective lens system disclosed by Japanese Kokai Patent Application No. Sho 61[1986]-275812 has a NA which may be as large as 0.95. However, the coma is still degraded in this system by a change in the thickness of the cover glass.

The system disclosed in Japanese Kokai Patent Application No. Hei 5[1993]-119263 is designed for use without using fluorescent glass. It is difficult, therefore, to ensure a high light transmissivity at a wavelength of 340 nm for the lens configuration in this system. The high performance expected from a fluorescence microscope cannot be fully realized as a result. Because emitted fluorescence is always faint, fluorescence is generated by the excitation light in the glass used for forming the objective lens. This phenomenon is known as self-fluorescence. When this takes place, the contrast of the observed image deteriorates significantly.

SUMMARY OF THE INVENTION

The purpose of this invention is to solve the aforementioned problems by providing an objective lens system for a microscope that has a high magnification and high numerical aperture and can correct adequately for various aberrations, especially coma, over a wide field of view. The objective lens system is particularly appropriate for use in a fluorescence microscope.

An objective lens system for a microscope according to the present invention contains a first lens group including multiple lenses placed in sequence from the object side and having a positive focal power. A second lens group includes a first compound lens, which is prepared by cementing a negative meniscus lens with its convex surface facing an object side of the system and a biconvex lens, and a second compound lens prepared by cementing a biconcave lens and a biconvex lens. A third lens group having multiple lenses and a negative focal power is also provided. A correction can be made for a change in aberration by moving the second lens group, with respect to the first and third lens groups, in the direction of the optical axis. The aforementioned objective lens system meets the following conditions:

$$|f2/F|>50 \tag{1}$$

$$0.3<D1/F<1.2 \tag{2}$$

In equations (1) and (2), F represents the focal distance of the whole objective lens system of the microscope, f2 represents the focal distance of the second lens group, and D1 represents the axial air gap between the first and second lens groups when a standard cover glass is used.

The aberration generated due to a change in the thickness of a cover glass can be corrected for by moving the second lens group along the optical axis. The second lens group includes a compound lens prepared by cementing a negative meniscus lens with its convex surface facing the object side of the system and a biconvex lens and another compound lens prepared by cementing a biconcave lens and a biconvex lens together. Because the second lens group has divergent cementing surfaces in the aforementioned configuration, a positive spherical aberration can be generated. Also, because the second lens group has the aforementioned configuration, other aberrations, especially coma, are hardly generated at all. The second lens group changes the spherical aberration alone and has no effect on the coma. When the second lens group is moved along the optical axis, the incident height, on the second lens group, of the light beams converged through the first lens group changes. Consequently, the spherical aberration generated on the cementing surface also changes.

The third lens group is able to correct for chromatic aberration in magnification. Good results are obtained when the third lens group includes compound lenses and has a negative focal power.

Various conditional formulas in this invention will be explained in detail. A first conditional formula, designated conditional formula (1), specifies the appropriate range of the focal power of the second lens group. According to this invention, when the second lens group is moved along the optical axis and there is a focal power in the second lens group, the image point of the objective lens system of the microscope changes. When the focal power becomes so large that it exceeds the range specified by formula (1), the image point changes significantly as the second lens group is moved along the optical axis. As a result, when correction is made for spherical aberration, it is necessary to add a correcting means for matching the point, which is inconvenient. In order to keep the curve of spherical aberration at low levels for good focusing, it is preferred that the focal power of the second lens group be kept in the range specified by conditional formula (1). Better results can be obtained if 110 is taken as the lower limit in conditional formula (1).

A second conditional formula, designated conditional formula (2), specifies the appropriate value for an axial air gap between the first and second lens groups. When this condition is met, a high-order spherical aberration is not generated and the change in the spherical aberration can be increased. When the air gap between the first and second lens groups is smaller than the lower limit of conditional formula (2), although the aberration can be corrected, the rear side of the first lens group and the front side of the second lens group are in physical contact with each other. On the other hand, if the air gap becomes large enough so that it exceeds the upper limit of conditional formula (2), then the light beam is incident on the second lens group at a lower height. As a result, the spherical aberration of the whole objective lens system of the microscope cannot be properly corrected. From the viewpoint of aberration correction, it is preferred that the air gap between the first and second lens groups be close to the lower limit. Better results can be obtained when 0.9 and 0.6 are taken as the upper limit and lower limit, respectively, of conditional formula (2).

It is preferred that the UV transmissivity of the whole objective lens system of the microscope be 20% or higher at an excitation light wavelength of 340 nm. As will be explained in the description of the first and second application examples which follows, the glass used for forming the objective lens for a microscope should have low self-fluorescence. If the UV transmissivity of the whole objective lens system of the microscope is not 20% or higher, then the fluorescence emitted from the object becomes very faint. As a result, the visual effects become very poor.

DESCRIPTION OF THE PREFERRED EMBODIMENTS

Figure 1:
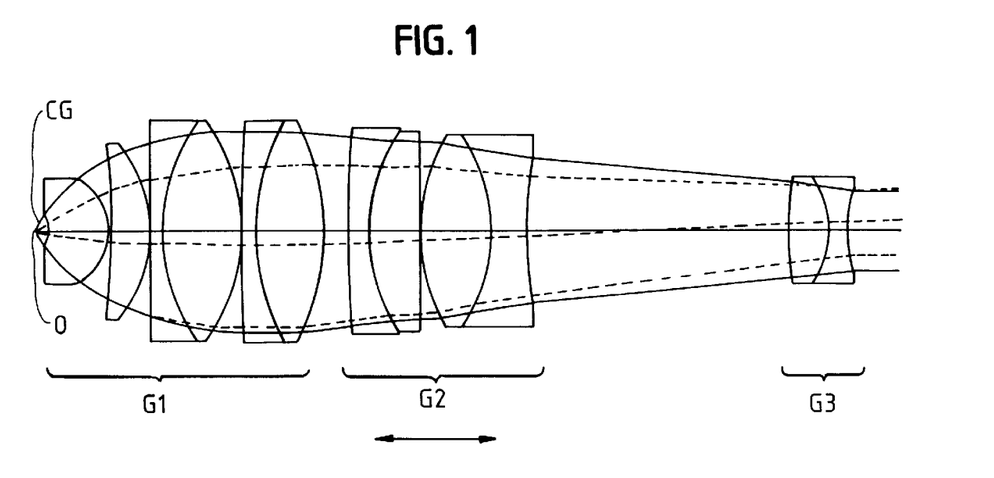
FIG. 1 is a diagram illustrating a configuration of the lens system in accordance with a first application example of this invention.
Figure 2A:
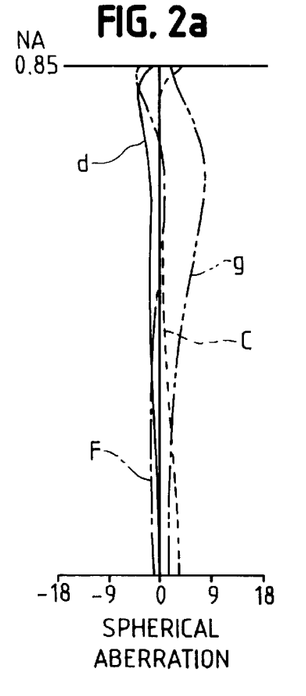
FIG. 2 is a diagram illustrating various aberrations in the first application example when a cover glass thickness t=0.17.
Figure 2B:
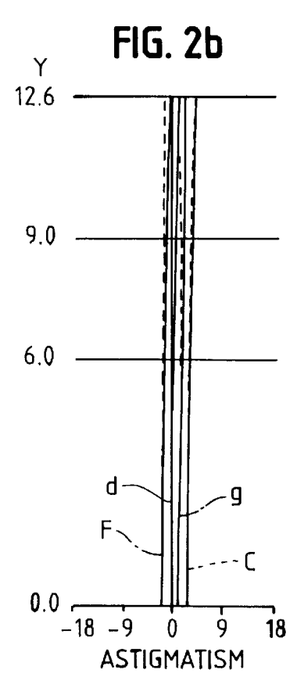
Figure 2C:
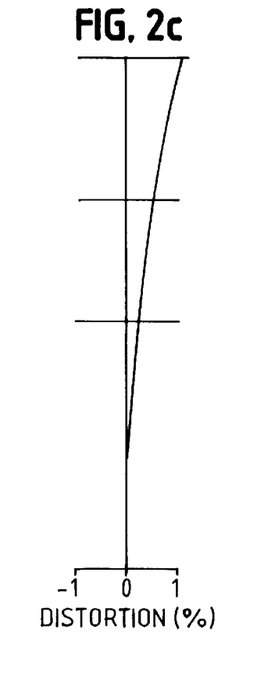
Figure 2D:
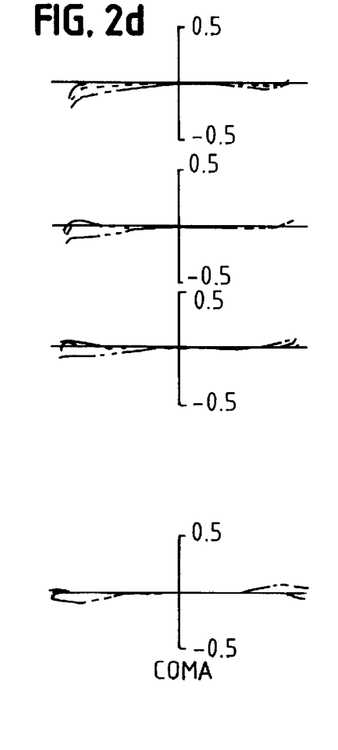
Figure 3A:
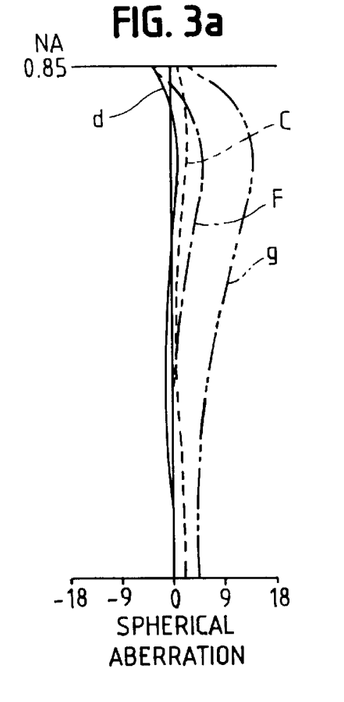
FIG. 3 is a diagram illustrating the various aberrations in the first application example when t=0.11.
Figure 3B:
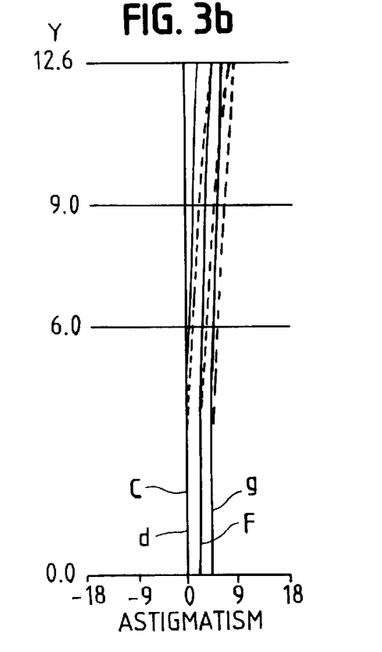
Figure 3C:
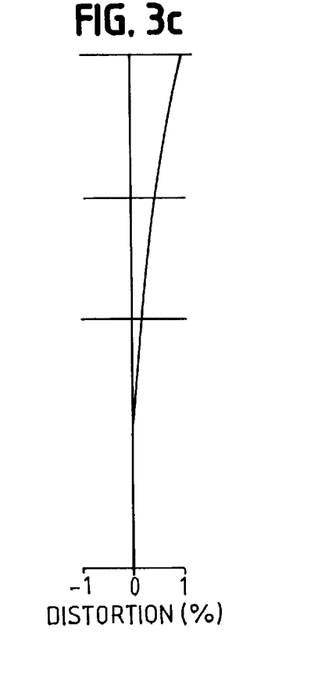
Figure 3D:
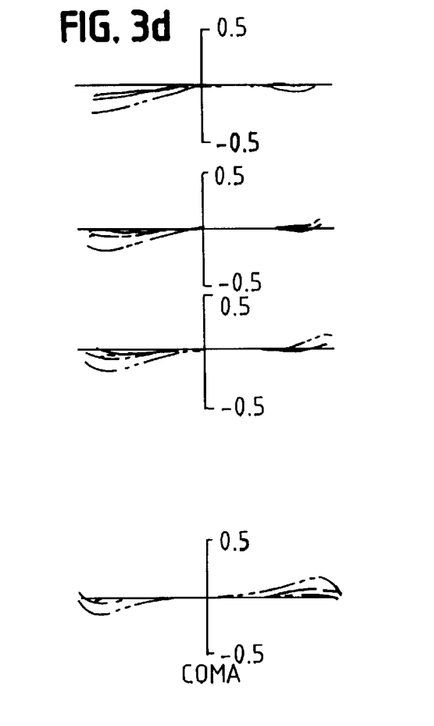
Figure 4A:
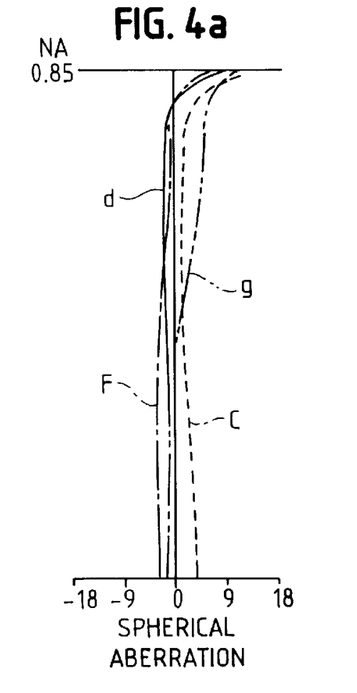
FIG. 4 is a diagram illustrating the various aberrations in the first application example when t=0.23.
Figure 4B:
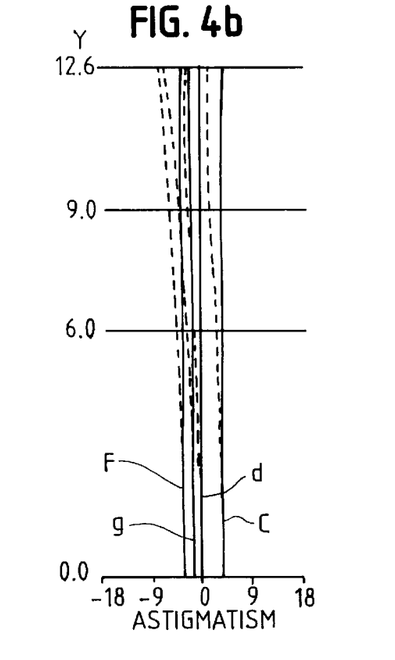
Figure 4C:
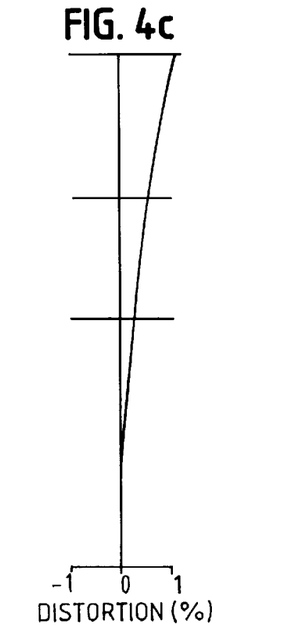
Figure 4D:
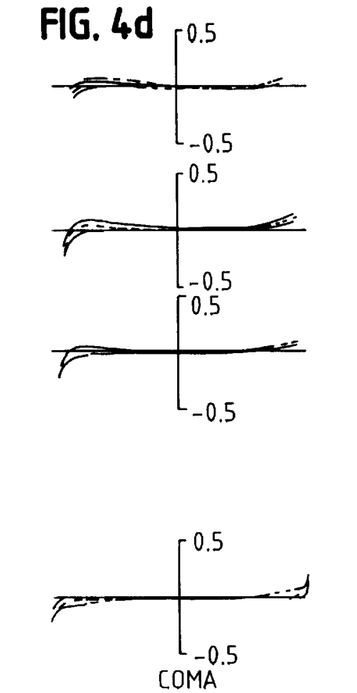

This invention will now be explained in more detail with reference to various application examples. The first application example shown in FIG. 1 is an achromatic objective lens system for reflected fluorescence with a magnification of 60 and a numerical aperture of 0.85. In the first application example, the objective lens includes a first lens group G1 with a positive focal power, a second lens group G2 that has little focal power and can be moved along the optical axis, and a third lens group G3 with a negative focal power. These lens groups are placed in sequence as counted from an object O. The first lens group G1 has a positive meniscus lens with its concave surface facing the object side, another positive meniscus lens with its concave surface facing the object side, a bonded meniscus lens prepared by cementing a biconcave lens and a biconvex lens, and a compound lens prepared by cementing a negative meniscus lens with its convex surface facing the object side and a biconvex lens. These components are placed in sequence as counted from the object side.

The second lens group G2 has a compound lens, which is prepared by cementing a negative meniscus lens with its convex surface facing the object side and a biconvex lens, and another compound lens prepared by cementing a biconvex lens and a biconcave lens. These compound lenses are placed in sequence as counted from the object side. The second lens group is movable over a prescribed distance along the optical axis.

The third lens group G3 has a bonded meniscus lens prepared by cementing a biconvex lens and a biconcave lens.

Table I lists the values of the various elements in the first application example. In Table I, β represents the magnification, NA represents the numerical aperture, F represents the focal distance, in mm, of the whole system, and f2 represents the focal distance, in mm, of the second lens group G2. The numbers on the left-hand side represent the sequence as counted from the object, r represents the radius of curvature, in mm, of each lens surface, d represents the distance, in mm, between two lens surfaces, nd represents the refractive index with respect to the d-line ($\lambda$=587.6 nm), and vd represents the Abbe number for the d-line. Also, t represents the thickness, in mm, of the plane parallel plate CG (cover glass), d0 represents the distance, in mm, from the surface of the cover glass on the side of the objective lens to the first lens surface of the first lens group, D1 represents the distance, in mm, between the surface of first lens group G1 on the side nearest to the image and the surface of second lens group G2 on the side nearest to the object, and D2 represents the distance, in mm, between the surface of second lens group G2 on the side nearest to the image and the surface of third lens group G3 on the side nearest to the side of object.

In the following application examples, t=0.17, nd=1.522, and vd=58.8 are set as the standard values for the plane parallel plate placed between the object surface and the first lens group. Correction is performed as the thickness t of the plane parallel plate changes.

TABLE I

First application example:

$\beta = -60.0$, NA = 0.85, d0 = 0.85
F = 3.33, f2 = −554
|f2/F| = 167
|D1/F| = 0.6

D1 corresponds to d10, and D2 corresponds to d16.

| NO. | r | d | nd | vd |
|---|---|---|---|---|
| 1 | −2.320 | 4.75 | 1.60311 | 60.64 |
| 2 | −3.900 | 0.2 | | |
| 3 | −40.420 | 3.0 | 1.49782 | 82.52 |
| 4 | −9.200 | 0.2 | | |
| 5 | −161.470 | 1.0 | 1.55200 | 49.71 |
| 6 | 12.450 | 6.0 | 1.49782 | 82.52 |
| 7 | −12.450 | 0.1 | | |
| 8 | 282.790 | 1.0 | 1.60342 | 38.03 |
| 9 | 13.740 | 5.0 | 1.43388 | 95.57 |
| 10 | −17.900 | 2.0 | | |
| 11 | 101.560 | 1.5 | 1.69680 | 55.60 |
| 12 | 11.360 | 4.0 | 1.50137 | 56.41 |
| 13 | −227.920 | 0.1 | | |
| 14 | 13.000 | 5.5 | 1.43388 | 95.57 |
| 15 | −10.850 | 3.0 | 1.55200 | 49.71 |
| 16 | 27.510 | 20.0 | | |
| 17 | 20.310 | 3.0 | 1.60342 | 38.03 |
| 18 | −5.990 | 1.5 | 1.60311 | 60.64 |
| 19 | 9.400 | | | |
| t | 0.17 | 0.11 | 0.23 | |
| d0 | 0.85 | 0.89 | 0.81 | |
| D1 | 2.0 | 1.0 | 3.0 | |
| D2 | 20.0 | 21.0 | 19.0 | |

FIGS. 2–4 are diagrams illustrating the various aberrations in the first application example. FIG. 2 is a diagram illustrating the aberrations when the cover glass has the standard thickness (t=0.17). FIG. 3 is a diagram illustrating the aberrations when the thickness of the cover glass is smaller than the standard thickness (t=0.11). FIG. 4 is a diagram illustrating the aberrations when the thickness of the cover glass is larger than the standard thickness (t=0.23). The aberration diagrams show, in sequence from the left-hand side, spherical aberration, astigmatism, field curvature or distortion, and coma. In the spherical aberration diagram and the coma diagram, the solid line represents the d-line, the dotted line represents the C-line, the one-dot-dash line represents the F-line, and the two-dot-dash line represents the g-line. In the astigmatism diagram, the solid line and the dotted line represent the sagittal image surface and the meridional image surface, respectively. In addition, NA in the upper-left corner of the spherical aberration diagram represents the numerical aperture, and y in the upper-left corner of the astigmatism diagram represents the height of the image in mm.

As can be seen from FIGS. 2–4, the objective lens system of the first application example corrects for various aberrations well. Coma is especially well corrected for. The objective lens system of this application example has a transmissivity, at a wavelength of 340 nm, of about 25%.

Figure 5:
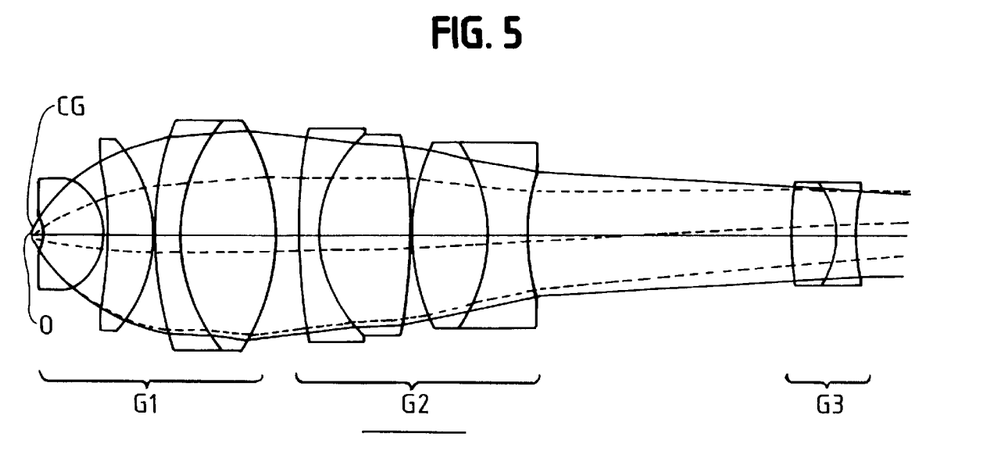
FIG. 5 is a diagram illustrating the configuration of the lens system in accordance with a second application example of this invention.
Figure 6A:
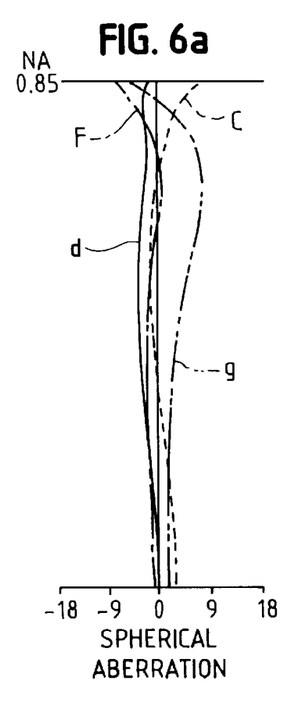
FIG. 6 is a diagram illustrating various aberrations in the second application example when t=0.17.
Figure 6B:
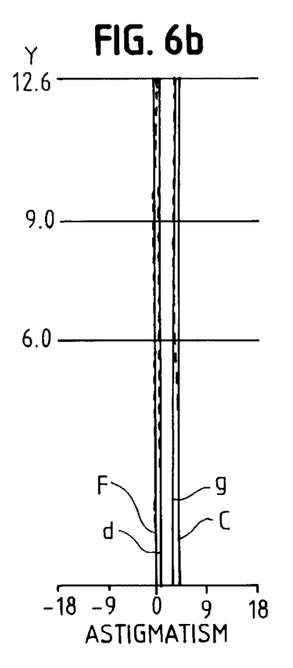
Figure 6C:
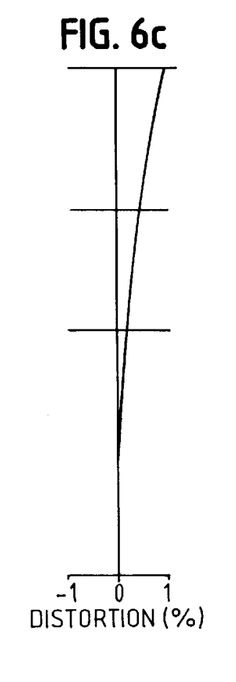
Figure 6D:
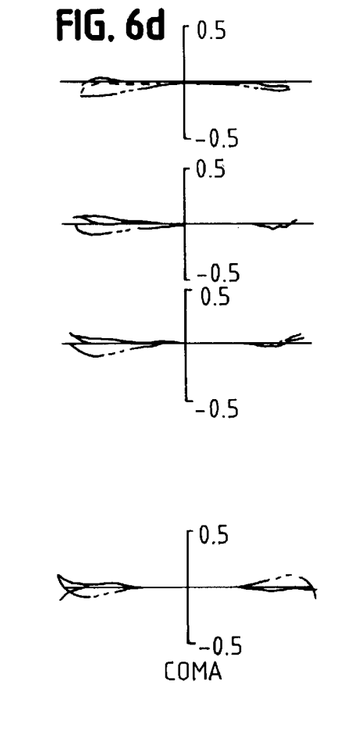
Figure 7A:
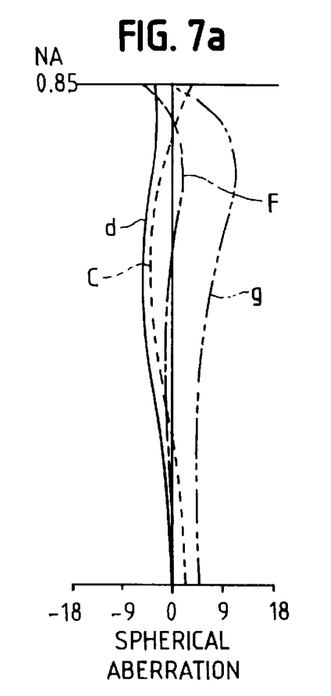
FIG. 7 is a diagram illustrating the various aberrations in the second application example when t=0.11.
Figure 7B:
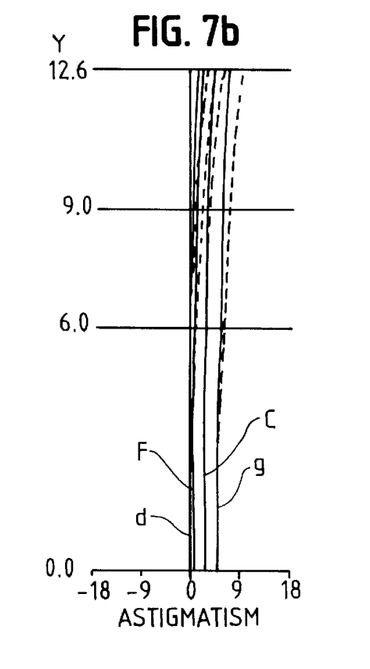
Figure 7C:
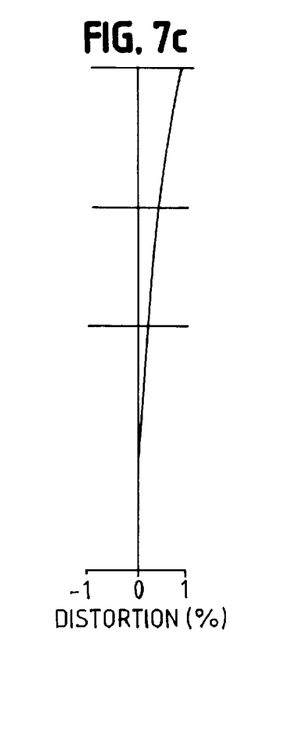
Figure 7D:
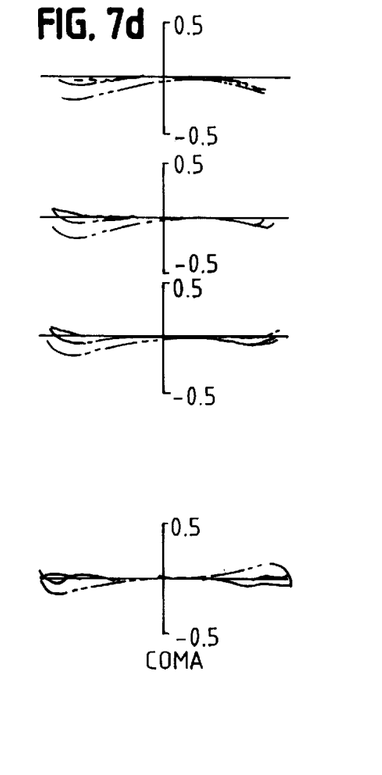
Figure 8A:
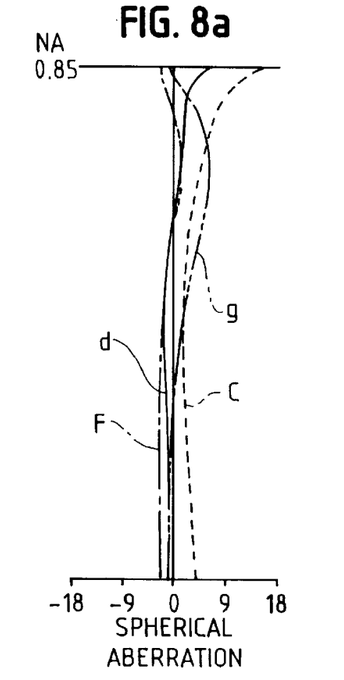
FIG. 8 is a diagram illustrating the various aberrations in the second application example when t=0.23.
Figure 8B:
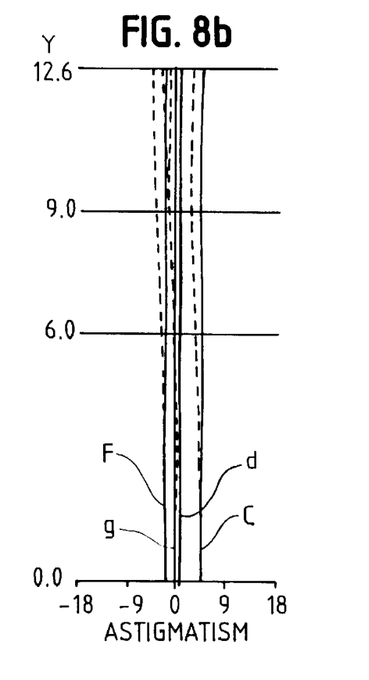
Figure 8C:
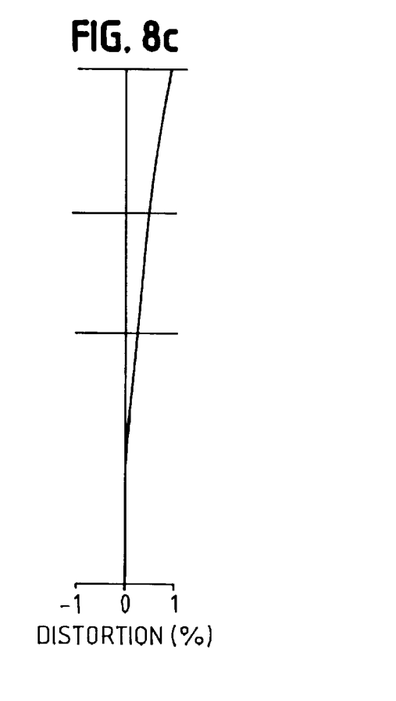
Figure 8D:
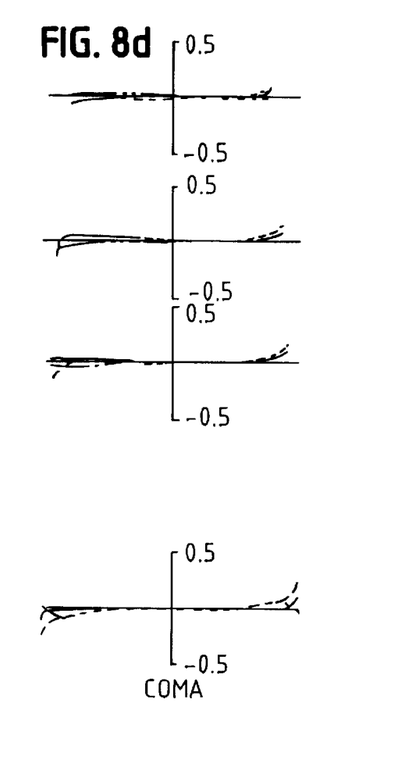

The second application example will now be explained. As shown in FIG. 5, the second application example has almost the same configuration as that of the first application example except for the structure of the first lens group. The first lens group G1 of the objective lens system for a microscope shown in the second application example includes a positive meniscus lens with its concave surface facing the object side, another positive meniscus lens with its concave surface facing the object side, and a compound lens prepared by cementing a negative meniscus lens with its convex surface facing the object side and a biconvex lens. These lenses are placed in sequence as counted from the object side O.

Table II lists the same elements in the second application example as those in the first application example.

TABLE II

Second application example:

$\beta = -60.0$, NA = 0.85, d0 = 0.85
F = 3.33, f2 = −367
|f2/F| = 110
|D1/F| = 0.56

D1 corresponds to d7, and D2 corresponds to d13.

| NO. | r | d | nd | vd |
|---|---|---|---|---|
| 1 | −2.390 | 4.75 | 1.60311 | 60.64 |
| 2 | −3.920 | 0.25 | | |
| 3 | −25.780 | 3.63 | 1.47982 | 82.52 |
| 4 | −8.700 | 0.25 | | |
| 5 | 21.250 | 2.0 | 1.60342 | 38.03 |
| 6 | 11.500 | 7.0 | 1.44488 | 95.57 |
| 7 | −13.670 | 1.88 | | |
| 8 | 40.180 | 1.5 | 1.57501 | 41.42 |
| 9 | 8.650 | 6.5 | 1.43388 | 95.57 |
| 10 | −29.480 | 0.13 | | |
| 11 | 14.030 | 5.5 | 1.43388 | 95.57 |
| 12 | −10.240 | 3.0 | 1.55200 | 49.71 |
| 13 | 11.410 | 20.0 | | |
| 14 | 22.020 | 3.13 | 1.60342 | 38.03 |
| 15 | −5.760 | 1.5 | 1.60311 | 60.64 |
| 16 | 12.590 | | | |
| t | 0.17 | 0.11 | 0.23 | |
| d0 | 0.85 | 0.89 | 0.81 | |
| D1 | 1.88 | 1.08 | 2.68 | |
| D2 | 20.0 | 20.8 | 19.2 | |

FIGS. 6–8 are diagrams illustrating various aberrations in the second application example. FIG. 6 is a diagram illustrating the aberrations when the cover glass has the standard thickness (t=0.17). FIG. 7 is a diagram illustrating the aberrations when the thickness of the cover glass is smaller than the standard thickness (t=0.11). FIG. 8 is a diagram illustrating the aberrations when the thickness of the cover glass is larger than the standard thickness (t=0.23). FIGS. 6–8, which illustrate the various aberrations in the second application example, have the same scales as those in the first application example.

As can be seen from FIGS. 6–8, the objective lens system of the second application example also corrects for various aberrations well. Again, coma is especially well corrected for. For the objective lens system of this application example, the transmissivity at a wavelength of 340 nm is about 30%.

Figure 9:
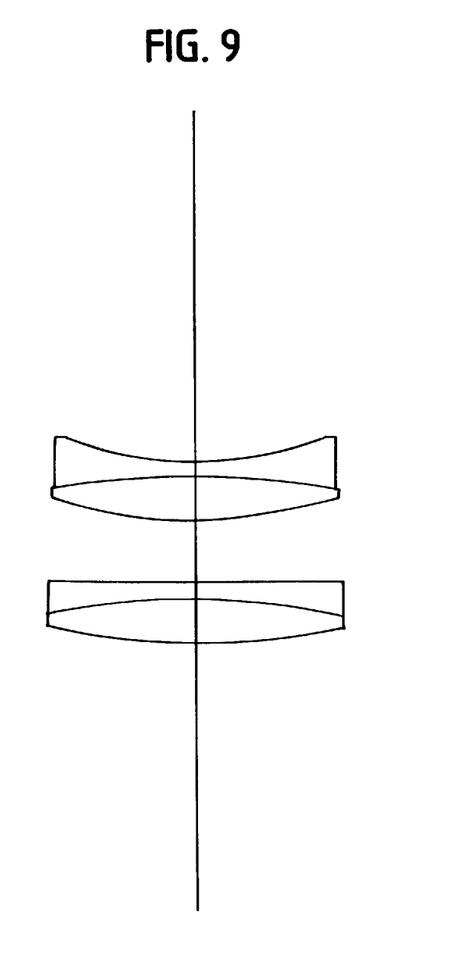
FIG. 9 is a diagram illustrating the configuration of a focusing lens that can be used together with the objective lens system in each application example of this invention.

The objective lens system in each of the aforementioned application examples is used together with the focusing lens represented in Table III and shown in FIG. 9 to form real images. The focusing lens is described by the lens data listed in Table III and has the configuration shown in FIG. 9. In Table III, the numbers on the left-hand side represent the sequence as counted from the object side, r represents the radius of curvature, in mm, of each lens surface, d represents the distance, in mm, between two lens surfaces, nd represents the refractive index with respect to the d-line (λ=587.6 nm), and vd represents the Abbe number for the d-line.

TABLE III

| NO. | r | d | nd | vd |
|---|---|---|---|---|
| 1 | 75.040 | 5.1 | 1.62280 | 57.03 |
| 2 | −75.040 | 2.0 | 1.74950 | 35.19 |
| 3 | 1600.580 | 7.5 | | |
| 4 | 50.260 | 5.1 | 1.66755 | 41.96 |
| 5 | −84.540 | 1.8 | 1.61266 | 44.41 |

In this case, the distance between the objective lens system for a microscope shown in the first or second application example and the focusing lens shown in FIG. 9 is in the range of 50–180 mm. When the distance is 150 mm, the various aberrations look like those shown in FIGS. 2–4 or FIGS. 6–8. Even when the distance is not 150 mm but still in the range of 50–180 mm, the aberrations are almost the same.

This invention provides a type of objective lens system equipped with a correcting ring that can correct for various aberrations well, especially coma, over a wide field of view with a magnification as high as about 60 and a numerical aperture as large as 0.85.

The objective lens system for a microscope of this invention can be used for a fluorescence microscope.

I claim:

1. An objective lens system for a microscope comprising:

a first lens group including multiple lenses placed sequentially from an object side of the system and having a positive focal power;

a second lens group including a first compound lens, having a negative meniscus lens with its convex surface facing the object side and a biconvex lens cemented to said negative meniscus lens, and a second compound lens, having a biconcave lens and a biconvex lens cemented to said biconcave lens; and a third lens group including multiple lenses and having a negative focal power;

wherein a change in aberration is corrected by moving the second lens group with respect to the first and third lens groups along an optical axis and the objective lens system meets the following conditions:

$|f2/F|>50$; and $0.3<D1/F<1.2$;

in which F represents a focal distance of the objective lens system of the microscope, f2 represents a focal distance of the second lens group, and D1 represents an axial air gap between the first and second lens groups when a standard cover glass is used.

2. The objective lens system for a microscope defined by claim 1, wherein said objective lens system has a UV transmissivity of at least 20% at an excitation light wavelength of 340 nm.

3. The objective lens system for a microscope defined by claim 1, wherein the first lens group is placed nearest to the object side of the system and has a positive meniscus lens component with a concave surface facing the object side of the system and a compound lens component and the third lens group includes a compound lens.

4. The objective lens system for a microscope defined by claim 2, wherein the first lens group is placed nearest to the object side of the system and has a positive meniscus lens component with a concave surface facing the object side of the system and a compound lens component and the third lens group includes a compound lens.

5. The objective lens system for a microscope defined by claim 1, wherein said multiple lenses of said first lens group include a positive meniscus lens with a concave surface facing the object side of the system and a compound lens disposed between said positive meniscus lens and said first compound lens of said second lens group.

6. The objective lens system for a microscope defined by claim 5, wherein the compound lens of said first lens group includes a negative meniscus lens and a biconvex lens secured to said negative meniscus lens.

7. The objective lens system for a microscope defined by claim 5, wherein said multiple lenses of said first lens group further comprise a bonded meniscus lens disposed between the compound lens of said first lens group and said positive meniscus lens.

8. The objective lens system for a microscope defined by claim 7, wherein said multiple lenses of said first lens group further comprise a second positive meniscus lens disposed between said positive meniscus lens with the concave surface facing the object side and said bonded meniscus lens.

9. The objective lens system for a microscope defined by claim 7, wherein said bonded meniscus lens includes a biconcave lens and a biconvex lens secured to a surface of said biconcave lens oriented away from the object side of the system.

10. The objective lens system for a microscope defined by claim 1, wherein the multiple lenses of said third lens group include a biconcave lens and a biconvex lens secured to an object side surface of the biconcave lens of said third lens group.

11. The objective lens system for a microscope defined by claim 6, wherein said multiple lenses of said first lens group further comprise a second positive meniscus lens disposed between said positive meniscus lens with the concave surface facing the object side and said negative meniscus lens of said compound lens of said first lens group.

12. An objective lens system for a microscope comprising:

a positive focal power lens element disposed at an object side of the system;

a negative focal power lens element disposed away from said object side of the system; and a movable lens group including a first compound lens, having a negative meniscus lens with its convex surface facing the object side and a biconvex lens cemented to said negative meniscus lens, and a second compound lens, having a biconcave lens and a biconvex lens cemented to said biconcave lens, disposed between said positive and negative focal power lens elements;

wherein a change in aberration is corrected by moving the movable lens group with respect to the positive and negative focal power lens elements along an optical axis and the objective lens system meets the following conditions:

$|f2/F|>50$; and $0.3<D1/F<1.2$;

in which F represents a focal distance of the object lens system of the microscope, f2 represents a focal distance of the movable lens group, and D1 represents an axial air gap between the positive focal power lens element and the movable lens group when a standard cover glass is used.

13. The objective lens system for a microscope defined by claim 12, wherein said positive focal power lens element has multiple lenses including a positive meniscus lens with a concave surface facing the object side of the system and a compound lens disposed between said positive meniscus lens and said first compound lens of said movable lens group.

14. The objective lens system for a microscope defined by claim 13, wherein the compound lens of said positive focal power lens element includes a negative meniscus lens and a biconvex lens secured to said negative meniscus lens.

15. The objective lens system for a microscope defined by claim 13, wherein said multiple lenses further comprise a bonded meniscus lens disposed between the compound lens of said positive focal power lens element and said positive meniscus lens.

16. The objective lens system for a microscope defined by claim 15, wherein said multiple lenses further comprise a second positive meniscus lens disposed between said positive meniscus lens with the concave surface facing the object side and said bonded meniscus lens.

17. The objective lens system for a microscope defined by claim 15, wherein said bonded meniscus lens includes a biconcave lens and a biconvex lens secured to a surface of said biconcave lens oriented away from the object side of the system.

18. The objective lens system for a microscope defined by claim 12, wherein said negative focal power lens element includes a biconcave lens and a biconvex lens secured to an object side surface of the biconcave lens of said negative focal power lens element.

19. The objective lens system for a microscope defined by claim 14, wherein said multiple lenses of said positive focal power lens element further comprise a second positive meniscus lens disposed between said positive meniscus lens with the concave surface facing the object side and said negative meniscus lens of said compound lens of said positive focal power lens element.

20. The objective lens system for a microscope defined by claim 12, wherein said objective lens system has a UV transmissivity of at least 20% at an excitation wavelength of 340 nm.

* * * * *